US009487125B2

(12) United States Patent
Geller (10) Patent No.: US 9,487,125 B2
(45) Date of Patent: Nov. 8, 2016

(54) EXTERNAL ZERO EMISSIONS INDICATOR

(71) Applicant: Toyota Motor Engineering & Manufacturing North America, Inc., Erlanger, KY (US)

(72) Inventor: Benjamin M. Geller, Hermosa Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/616,483

(22) Filed: Feb. 6, 2015

(65) Prior Publication Data

US 2016/0229335 A1 Aug. 11, 2016

(51) Int. Cl.
*B60Q 1/26* (2006.01)
*B60Q 1/30* (2006.01)
*G08B 5/36* (2006.01)

(52) U.S. Cl.
CPC .. *B60Q 1/30* (2013.01); *G08B 5/36* (2013.01)

(58) Field of Classification Search
CPC ........ B60W 20/00; Y02T 10/62; B60L 11/00
USPC ............................... 340/468, 463; 180/65.21
See application file for complete search history.

(56) References Cited

U.S. PATENT DOCUMENTS

| | | | |
|---|---|---|---|
| 5,486,808 A | 1/1996 | Nejdl | |
| 5,757,595 A | 5/1998 | Ozawa et al. | |
| 6,424,157 B1 | 7/2002 | Gollomp et al. | |
| 7,639,019 B2 | 12/2009 | Bosse et al. | |
| 7,893,822 B2* | 2/2011 | Gerber | B60Q 1/503 180/65.235 |
| 8,009,030 B2 | 8/2011 | Van Neste | |
| 8,125,324 B2 | 2/2012 | Frey et al. | |
| 8,179,245 B2 | 5/2012 | Chander et al. | |
| 8,212,666 B2* | 7/2012 | Meurle | B60K 6/365 340/463 |
| 8,487,752 B2 | 7/2013 | Stillfried et al. | |
| 2010/0235016 A1* | 9/2010 | Grider | B60K 6/48 701/2 |
| 2011/0288712 A1* | 11/2011 | Wang | B60K 6/445 701/22 |
| 2015/0006018 A1* | 1/2015 | Tesanovic | G07C 5/0808 701/29.6 |

FOREIGN PATENT DOCUMENTS

| | | |
|---|---|---|
| DE | 102011002225 | 10/2012 |
| DE | 102012004742 | 9/2013 |
| DE | 102012020883 | 12/2013 |
| JP | 2003260990 | 9/2003 |
| WO | WO2014/124996 | 8/2014 |

* cited by examiner

*Primary Examiner* — Phung Nguyen
(74) *Attorney, Agent, or Firm* — Snell & Wilmer LLP (57) ABSTRACT

A system for notifying a third party as to whether a vehicle is producing or generating emissions. The system includes an internal combustion engine capable of producing exhaust gases, an exhaust pipe coupled to the internal combustion engine and for allowing passage of the exhaust gases and a sensor positioned within the exhaust pipe and configured to determine a characteristic of the exhaust gases. The system also includes a switch configured to activate and deactive a zero emissions mode, an electronic control unit (ECU) for determining whether emissions are present based on at least one of the characteristic of the exhaust gases or the zero emissions mode and an external light, controlled by the ECU, that is activated when no emissions are present.

20 Claims, 6 Drawing Sheets

FIG. 4B

EXTERNAL ZERO EMISSIONS INDICATOR

BACKGROUND

1. Field

The present invention relates to a vehicle system or method that determines whether a vehicle is currently operating with zero emissions and/or in a zero emissions mode and then provides an indication that is visible from outside the vehicle showing that the vehicle is currently operating with zero emissions and/or in a zero emissions mode. The system or method can also transmit this information to an external device indicating that the vehicle is currently operating with zero emissions and/or in a zero emissions mode.

2. Description of the Related Art

Electric vehicles (EVs) and hybrid vehicles (HVs) are becoming very popular and are now being sold throughout the world. A HV has an internal combustion engine and an electric motor that are each used to power the vehicle. HVs have an internal combustion engine but can operate in an electric vehicle (EV) mode if enough battery charge is available to power the vehicle. The EV mode means that only the electric motor (and not the internal combustion engine) is used to power the vehicle. A plug-in hybrid vehicle (PHV) also has an internal combustion engine and an electric motor that are each used to power the vehicle. The PHV has a built-in energy storage device that allows it to be charged using an external power source (e.g., a power supply at a charging station).

A fuel cell vehicle (FCV) or a fuel cell electric vehicle (FCEV) uses a fuel cell to power its on-board electric motor. Fuel cells in vehicles create electricity to power an electric motor, generally using oxygen from the air and hydrogen. FCVs, FCEVs, EVs and HVs in the EV mode generally emit little to no emissions and as a result, produce several environmental benefits such as cleaner air. The term "vehicle" and "hybrid vehicle" will be used herein to refer to these types of vehicles.

Drivers of HVs can sometimes manually activate and deactive the EV mode by using a switch. That is, a driver can simply move or touch a switch to activate and deactivate the EV mode. If the EV mode is activated by the driver, an indicator may appear on the dashboard next to the speedometer indicating that the vehicle is operating in the EV mode. In the EV mode, however, the vehicle may be producing some emissions. Also, a person outside the vehicle is unable to determine which mode the vehicle is operating in and whether the vehicle is or is not producing emissions.

Thus, there is a need for a system and method of determining whether a vehicle is producing emissions and notifying a third party who is outside the vehicle what mode the vehicle is operating in and whether the vehicle is or is not producing emissions.

SUMMARY

A system for notifying a third party as to whether a vehicle is producing or generating emissions includes an internal combustion engine capable of producing exhaust gases, an exhaust pipe coupled to the internal combustion engine and for allowing passage of the exhaust gases and a sensor positioned within the exhaust pipe and configured to determine a characteristic of the exhaust gases. The system also includes a switch configured to activate and deactive an EV mode, an electronic control unit (ECU) for determining whether emissions exist based on at least one of the characteristic of the exhaust gases or the EV mode and an external light, controlled by the ECU, that is activated when no emissions exist.

A method for notifying a third party as to whether a vehicle is producing or generating emissions is disclosed. The method includes determining, using a sensor positioned within an exhaust pipe of the vehicle, a characteristic of exhaust gases within the exhaust pipe and determining, using an ECU, whether a switch indicating a zero emissions mode is activate or deactive. The method also includes determining, using the ECU, whether emissions are present based on at least one of the characteristic of the exhaust gases or the zero emissions mode and activating, using the ECU, an external light when no emissions are present.

A vehicle capable of generating zero emissions, the vehicle including a battery for powering the vehicle, an internal combustion engine for powering the vehicle or charging the battery and an emissions sensor, coupled to an output of the internal combustion engine, for determining an amount of emissions being emitted from the internal combustion engine. The vehicle also includes a mode sensor for determining whether the vehicle is in a zero emissions mode, an electronic control unit for setting a zero emissions indicator when the amount of emissions is zero or when the mode sensor indicates the zero emissions mode and a transmitter, coupled to the electronic control unit, configured to transmit the zero emissions indicator to a third party device, which is remote from the vehicle.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The systems, ECUs and methods described herein provide the systems, ECUs and methods provide third parties (e.g., police officers, administrators, government officials, traffic enforcers, other drivers, pedestrians, etc.) with a dynamic, real-time determination and notification as to whether a vehicle is operating with zero emissions (e.g., in an EV mode or a fuel cell mode). That is, an emissions sensor and/or a zero emissions switch are used to determine in real-time whether the vehicle is producing emissions and then automatically notifies a third party as to the current real-time emissions of the vehicle. In addition, the combination of the emissions sensor and the zero emissions switch provides the advantages and benefits of ensuring the electronics are working properly and obtaining a more accurate determination as to whether the vehicle is generating or producing emissions. The present invention allows third parties to be notified in real-time via an external device (e.g., a cell phone) or an external light on the vehicle as to whether the vehicle is currently operating with zero emissions or with emissions.

The system or method transmits this information to the external device indicating that the vehicle is currently operating with zero emissions and/or in a zero emissions mode. The external device can also provide the third party with the amount and type of emissions the vehicle is producing or generating and the exact location of the vehicle relative to the external device. By reviewing this information using the external device and/or by observing the external lights, the third party is able to quickly and easily determine whether the driver of the vehicle is in compliance with local or state regulations or laws related to emissions and the exact location of the vehicle if compliance is not met.

An exemplary system for notifying a third party as to whether a vehicle is producing or generating emissions includes an internal combustion engine capable of producing exhaust gases, an exhaust pipe coupled to the internal combustion engine and for allowing passage of the exhaust gases and a sensor positioned within the exhaust pipe and configured to determine a characteristic of the exhaust gases. The system also includes a switch configured to activate and deactive a zero emissions mode and an electronic control unit (ECU) for determining whether emissions are present based on at least one of the characteristic of the exhaust gases or the zero emissions mode. The emissions information can be transmitted to an external device and can be used to activate an external light on the vehicle when no emissions are present. The terms EV mode and zero emissions mode can be used interchangeably throughout this disclosure. In addition, the term low emissions mode can be used to indicate very low to zero emissions.

Figure 1:
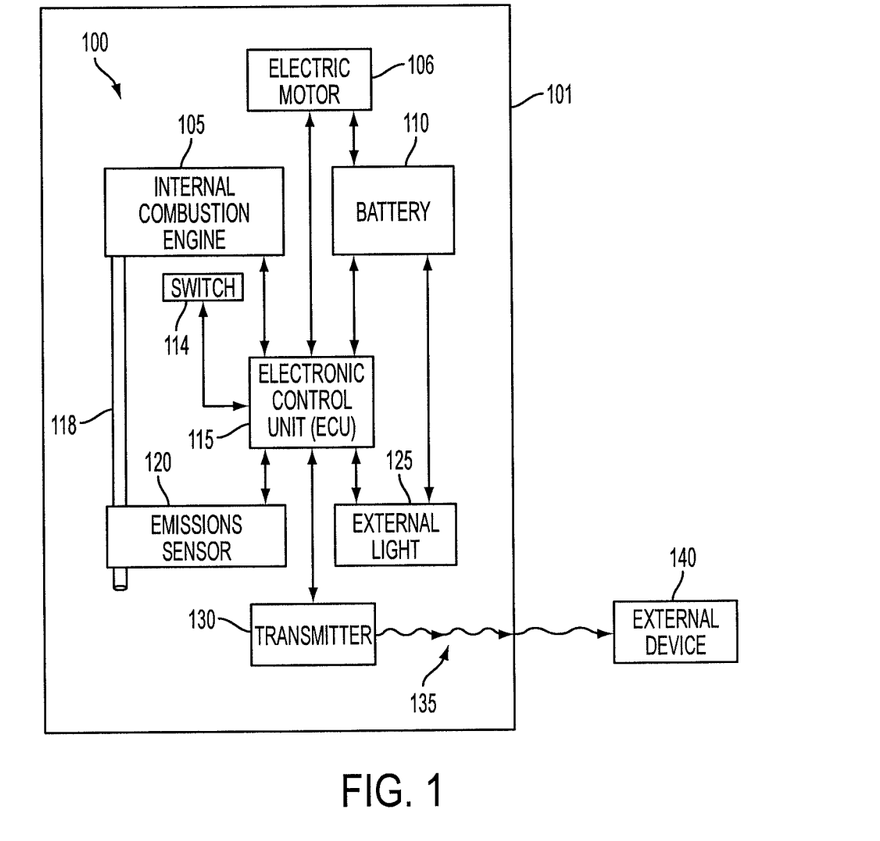
FIG. 1 illustrates a simplified block diagram of a system for determining whether a vehicle is producing emissions and notifying a third party who is outside the vehicle what mode the vehicle is operating in and whether the vehicle is or is not producing emissions according to an embodiment of the present invention.

FIG. 1 illustrates a simplified block diagram of a system 100 for determining whether a vehicle 101 is producing emissions and notifying a third party who is outside the vehicle 101 what mode (e.g., a zero emissions mode) the vehicle 101 is operating in and/or whether the vehicle 101 is or is not producing emissions according to an embodiment of the present invention. The vehicle 101 can be an EV, a HV, a PHV, a FCV, a FCEV and other similar vehicles. The system 100 includes an internal combustion engine 105, an electric motor 106, a battery 110 (or batteries), a switch 114, an electronic control unit (ECU) 115, an exhaust manifold downpipe 118, an emissions sensor 120, an external light 125 and a transmitter 130. A fuel cell can be used in place of the internal combustion engine 105. The term "engine" will be used in this disclosure but one skilled in the art will know how to utilize a fuel cell in place of the engine 105.

Figure 4A:
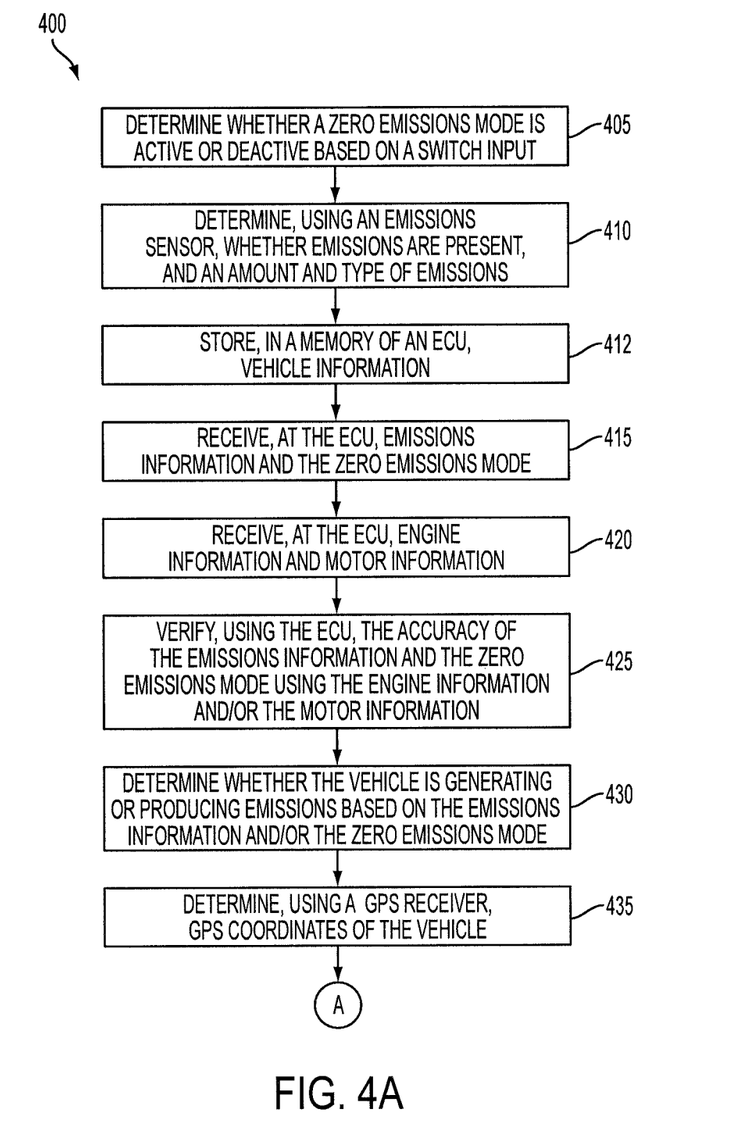
FIGS. 4A-4B is a flowchart of a method for determining whether a vehicle is operating with zero emissions and notifying a third party as to whether the vehicle is operating with zero emissions according to an embodiment of the present invention.

The internal combustion engine 105 and/or the electric motor 106 may be used to power the vehicle 101. The internal combustion engine 105 and the electric motor 106 can be used individually or simultaneously to drive the transmission of the vehicle 101. The electric motor 106 can supplement the internal combustion engine 105 and/or serve as a generator to recharge the battery 110 while the vehicle 101 is operating. Depending on the amount of charge remaining in the battery 110, a driver may use the switch 114 to activate and deactivate the zero emissions mode of the vehicle 101 (step 405). The switch 114 can be a control device, a physical switch, a sensor, an electronic switch or a button on a touch screen. In one embodiment, the switch 114 is a mode sensor that automatically determines the mode (e.g., a zero emissions mode, an EV mode, a fuel cell mode, etc.) of the vehicle 101. When the zero emissions mode is active, the internal combustion engine 105 is generally off and when the zero emissions mode is deactive, the internal combustion engine 105 is generally on.

The battery 110 may be used to power the electric motor 106 as well as the components and electronics of the vehicle 101 such as the switch 114, the ECU 115, the emissions sensor 120, the external light 125 and the transmitter 130.

The emissions sensor 120 can be an exhaust emissions sensor that monitors or determines whether emissions exist or are present, and the amount and type of emissions output by the internal combustion engine 105 (step 410). For example, the emissions sensor 120 can monitor or determine the amount of hydrocarbon (HC), volatile organic compound (VOX), carbon dioxide ($CO_2$), carbon monoxide (CO), nitrogen gas ($N_2$), water vapor ($H_2O$) and/or nitrogen oxides (NOX) levels in the exhaust gases. The emissions sensor 120 is located or mounted in the engine exhaust system such as in the exhaust manifold downpipe 118 before the catalytic converter, between the exhaust manifold and the catalytic converter or after the catalytic converter. As the exhaust gases travel down the exhaust manifold downpipe 118, the emissions sensor 120 receives the exhaust gases and determines the amount and type of emissions in the exhaust gases. The emissions sensor 120 can determine the absence (i.e., no emissions) or presence (i.e., some emissions) of emissions being output by the internal combustion engine 105. This generally occurs when the internal combustion engine 105 is turned off (e.g., no emissions) or is turned on (e.g., some emissions). The amount of emissions, presence or absence of emissions and/or type of emissions can be referred to as the emissions information. The emissions sensor 120 may provide or transmit the emissions information to the ECU 115.

The emissions sensor 120 can enable regulation and monitoring of the vehicle's emissions state. In addition, the emissions sensor 120 can be a standard unit or device incorporated into all vehicles to allow regulation by a third party (e.g., a government agency) of compliance to the emissions laws and regulations and to provide continuity and promote consistency across vehicles. In certain areas or countries, the third party may require these emissions sensors 120 to be installed on all vehicles. The emissions sensor 120 improves upon the accuracy of the ECU's 115 decision making ability and provides standardization for the ECU 115. The emissions sensor 120 may be optional.

The emissions sensor 120 can be replaced with a temperature sensor for determining the temperature of the exhaust gases. If exhaust gases are present, the temperature sensor will measure a temperature of the exhaust gases and the ECU 115 will determine whether the measured temperature is greater than a predetermined temperature (e.g., the temperature of ambient or outside air). Therefore, the predetermined temperature is set to a temperature that indicates the presence or absence of exhaust gases from the internal combustion engine 105. If the temperature sensor senses a temperature that is greater than or equal to the predetermined temperature, the ECU 115 determines that emissions are present. If the temperature sensor senses a temperature that is less than the predetermined temperature, the ECU 115 determines that emissions are not present.

The ECU 115 may include a memory that stores the vehicle information 210 such as a make, a model, a year, a color, a type of vehicle (e.g., number of doors, hatchback, SUV, sedan, coupe, truck, etc.) and a license plate number of the vehicle 101 (step 412).

The ECU 115 receives or requests the emissions information from the emissions sensor 120 and the zero emissions mode information from the switch 114 (step 415). Sometimes, when the vehicle 101 has been switched to the zero emissions mode (i.e., by the ECU 115 or the switch 114), the vehicle 101 may still be producing emissions because the internal combustion engine 105 is on and is being used to recharge the battery 110. In this situation, the vehicle 101 is still producing emissions even though the zero emissions mode is active. Therefore, the emissions sensor 102 provides a more accurate way of determining whether the vehicle 101 is operating with zero emissions. The combination of the emissions information and the zero emissions mode information provides the advantage of ensuring that the electronics are working properly and obtaining a more accurate determination of whether the vehicle 101 is generating or producing emissions. If the emissions sensor 120 is not present on the vehicle 101 or not working properly, the ECU 115 can utilize at least one of the zero emissions mode information, engine information and/or motor information to determine whether the vehicle 101 is producing or generating emissions.

The ECU 115 also receives or requests engine information from the internal combustion engine 105 indicating whether the internal combustion engine 105 is operating or has been shut off and motor information from the electric motor 106 indicating whether the electric motor 106 is operating or has been shut off (step 420). The engine information and/or the motor information can be used to verify the accuracy or proper functioning of the emissions sensor 120 and/or the switch 114 (step 425). For example, the ECU 115 may receive engine information indicating that the internal combustion engine 105 is off but the emissions sensor 120 may indicate that the vehicle 101 is generating emissions. This may indicate that the emissions sensor 120 is not functioning properly. Also, the ECU 115 may receive zero emissions mode information indicating that the zero emissions mode is deactive but the emissions sensor 120 may indicate that no emissions are being produced. This may indicate that the switch 114 and/or emissions sensor 120 is not functioning properly.

Using the emissions information and/or the zero emissions mode information, the ECU 115 determines whether the vehicle 101 is generating or producing emissions or operating without generating or producing any emissions (step 430). The emissions information includes information such as whether the vehicle 101 is generating or producing emissions or operating without generating or producing any emissions.

Figure 4B:
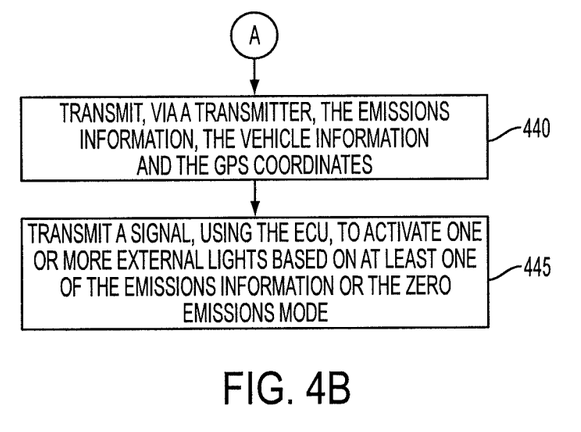

The ECU 115 may include a GPS receiver that can determine GPS coordinates of the vehicle 101 (step 435). The ECU 115, via the transmitter 130, sends or transmits the emissions information, the vehicle information and the GPS coordinates to an external device 140 (step 440). The external device 140 is generally a remote device (e.g., a cell phone, a smart phone, a tablet, a smart watch or a transceiver) capable of being held by a person.

Figure 2:
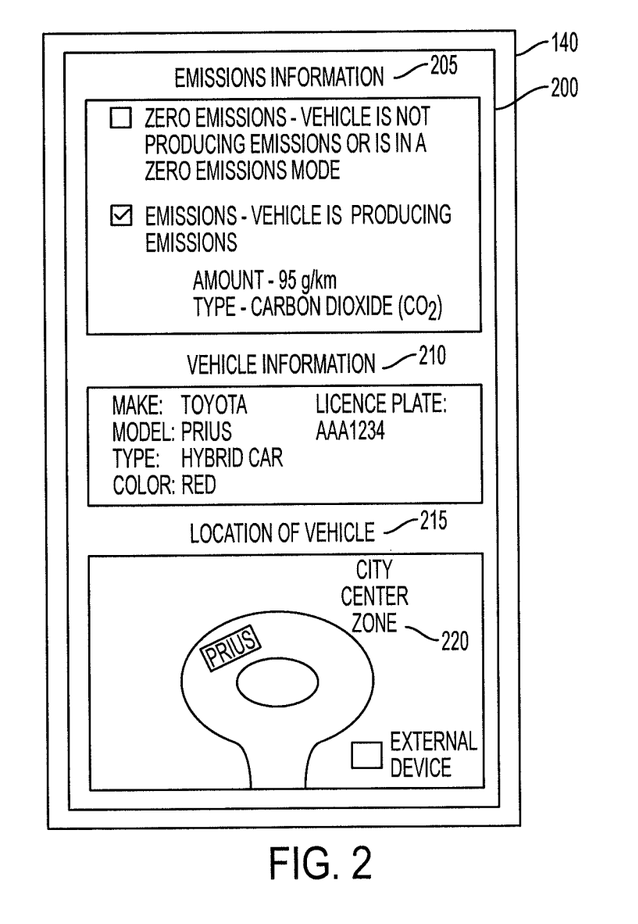
FIG. 2 illustrates a simplified block diagram of a display screen of the external device of FIG. 1 for displaying emissions information, vehicle information and location information according to an embodiment of the present invention.

FIG. 2 illustrates a simplified block diagram of a display screen 200 of the external device 140 of FIG. 1 for displaying emissions information 205, vehicle information 210 and location information 215 according to an embodiment of the present invention. The emissions information 205 can include indicators showing whether the vehicle 101 is generating or producing zero emissions or in a zero emissions mode or is generating or producing some emissions. If some emissions are being generated or produced, the display screen 200 can show an amount and type of emissions. As shown in FIG. 2 as an example, the emissions amount is 95 g/km and the emissions type is Carbon Dioxide ($CO_2$). The display screen 200 can also show whether the emissions amount for the emissions type is greater than a safe amount as required by the laws and regulations. For example, the display screen 200 can have a red indicator or background when the vehicle 101 has an emissions amount of 150 g/km of Carbon Dioxide, which is greater than the safe amount of 125 g/km of Carbon Dioxide. This can allow the third party to fine or ticket the driver of the vehicle 101 due to the violation.

The transmitter 130 may send or transmit the emissions information, the vehicle information and/or the GPS coordinates continuously or periodically (e.g., every 1 minute). Sending the information continuously or periodically allows the external device 140 to receive the most current information about the vehicle 101. For example, the vehicle 101 may change from the EV mode to the HV mode, which would result in the emissions information changing if the vehicle 101 was operating using the internal combustion engine 105. This allows the third party to be able to get a more accurate, real-time determination as to whether the vehicle 101 is generating emissions.

The system 100 is configured to allow one or more external devices 140 to receive the emissions information 205, the vehicle information 210 and the location information 215. The transmitter 130 broadcasts signals that include data representing the emissions information 205, the vehicle information 210 and the location information 215. The transmitter 130 can be a high power transmitter capable of transmitting these signals up to 1 mile. The signals are transmitted using wireless communications 135 such as RFID, NFC, Bluetooth, radio signals, etc. The data is generally encrypted to allow only authorized external devices 140 to receive this information.

The external device 140 provides an indication that is external to the vehicle 101. The external device 140 allows third parties (e.g., police officers, administrators, government officials, traffic enforcers, other drivers, pedestrians, etc.) to be notified as to whether the vehicle 101 is currently operating with zero emissions or with emissions. The external device 140 allows the third party to monitor whether the vehicle 101 or driver is complying with specific country, state or city regulations and laws with regard to emissions and/or whether the vehicle 101 or driver is complying with the requirements of special driving lanes or locations. For example, some European countries have a city center zone 220 where any vehicle in the city center zone is required to be operating with zero emissions. As another example, many countries and states have car pool lanes or high-occupancy vehicle (HOV) lanes where a single occupant can used these lanes if the vehicle has a decal that indicates the vehicle is an energy efficient vehicle (e.g., an electric vehicle or a hybrid vehicle). However, these lanes are sometimes used by drivers of hybrid vehicles when the vehicle is operating using the internal combustion engine and is generating or producing emissions. This external indicator allows the third party to verify that the vehicle is currently operating with zero emissions in compliance with the laws and regulations. The present invention allows for a dynamic, real-time determination as to whether the vehicle 101 is operating with no emissions or with some emissions but within the safe standard.

Using the external device 140, the third party is able to easily locate the vehicle 101 and determine whether the driver is in compliance with the laws and regulations. For example, the display screen 200 can include location information 215 of the vehicle 101 in the form of a map or other direction information so the third party can quickly find the vehicle 101 relative to its current location (i.e., the location of the external device 140). The third party is generally an authorized government or state official who is responsible for monitoring and ensuring that these requirements are met.

Figure 3A:
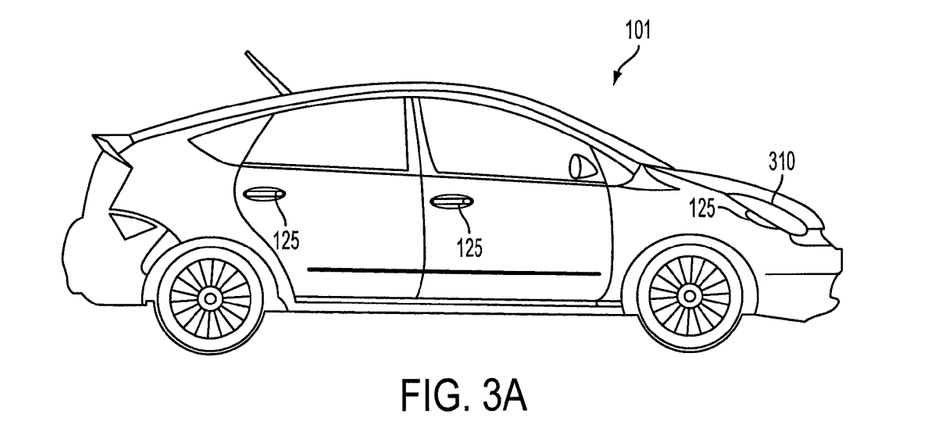
FIGS. 3A-3C are side, rear and front views of the vehicle showing various exemplary locations for the external light according to an embodiment of the present invention.
Figure 3B:
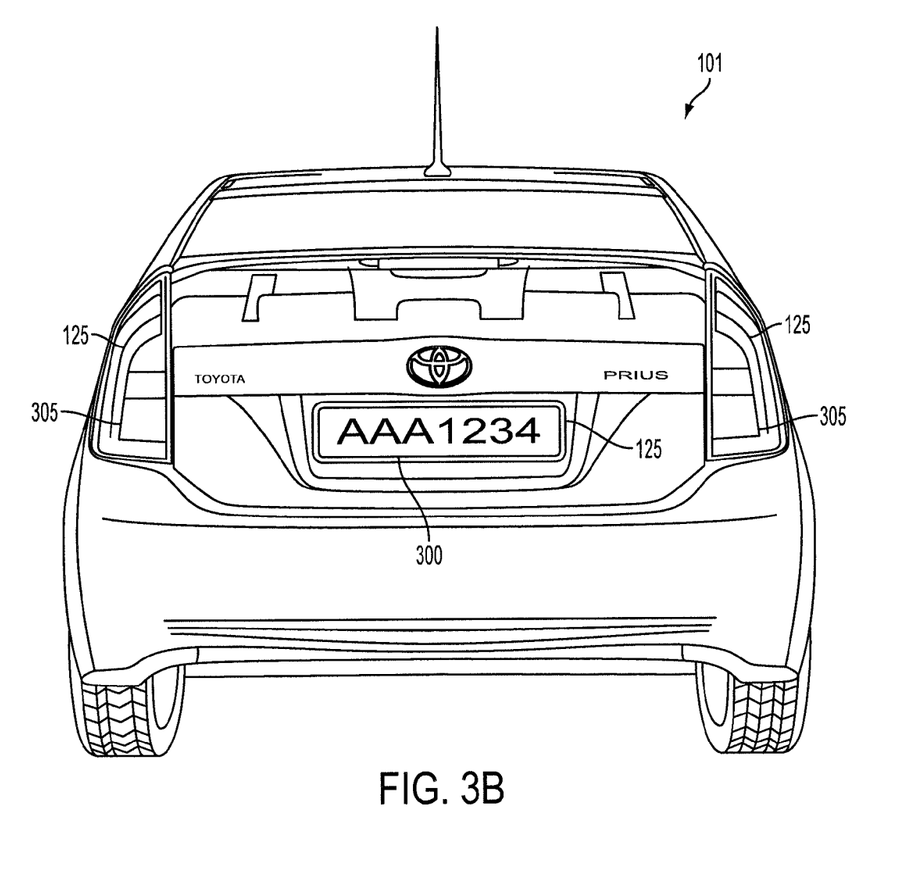
Figure 3C:
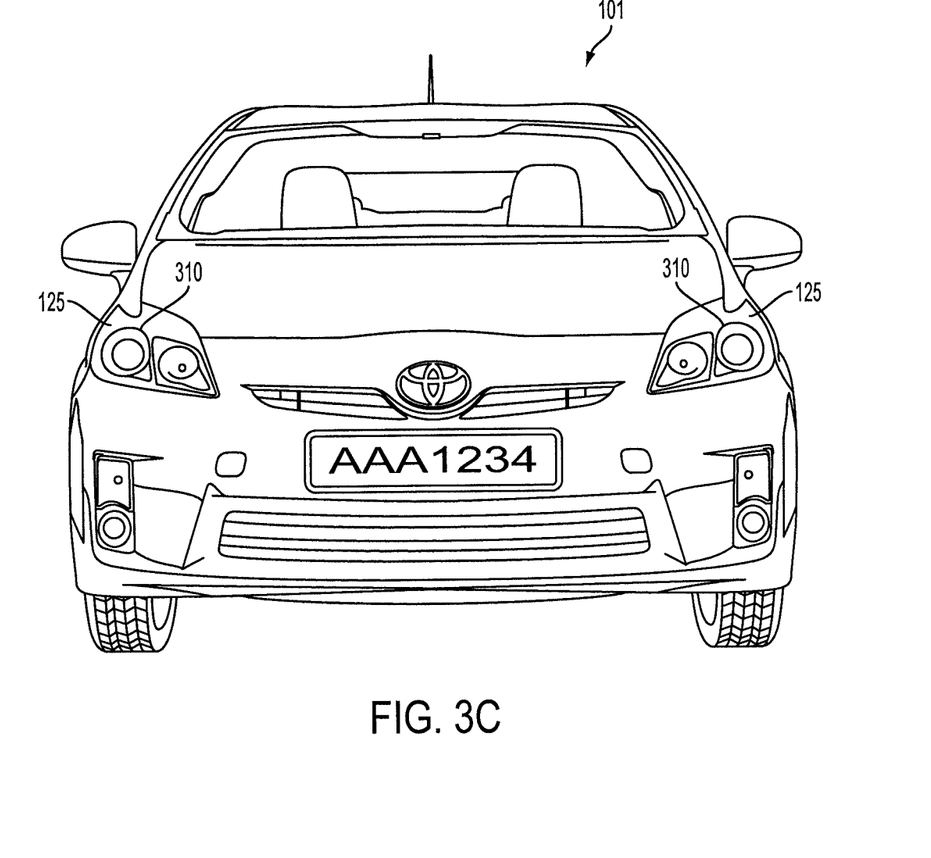

FIGS. 3A-3C are side, rear and front views of the vehicle 101 showing various exemplary locations for the external light 125 according to an embodiment of the present invention. The system 100 can also provide an indication to the third party of the emissions of the vehicle 101 in the form of an external light(s) 125 that are on the outside of the vehicle 101 or visible from outside the vehicle 101. For example, the external light 125 can also be used to show third parties who are outside but near the vehicle 101 that the vehicle 101 is currently operating with zero emissions. The external light 125 can LED lights that when illuminated indicate zero emissions operation. The external lights 125 can also take the form of external badges, emblems, charge doors, etc. Based on at least one of the emissions information, the zero emissions mode information, the engine information and/or the motor information, the ECU 115 can send a signal to turn on and turn off the external light(s) 125.

One or more external lights 125 can be located on the outside of the vehicle 101. The external light 125 are positioned to be easily viewed by the third party so the third party can easily determine if the vehicle 101 has complied with the laws and regulations. In some embodiments, the external light 125 is not viewable when the driver is sitting in the driver seat of the vehicle 101. When the ECU 115 determines that the vehicle 101 is operating with zero emissions (e.g., by the emissions sensor 120) or in a zero emissions mode (e.g., by the switch 114), the ECU 115 automatically controls the illumination of the external light 125 (step 445). In some embodiments, the driver cannot control the illumination of the external light 125 but rather the illumination (i.e., turning on and off) of the external light 125 is controlled solely by the ECU 115. This prevents the driver from inadvertently switching on the external light 125 when the vehicle 101 is not operating with zero emissions.

FIG. 3A shows the external light 125 positioned on or adjacent to the door handles of the vehicle 101. FIG. 3B shows the external light 125 positioned around or adjacent to the license plate 300 and around or adjacent to the rear taillights 305. FIG. 3C shows the external light 125 positioned around or adjacent to the front headlights 310. The external light 125 can also be a green color or other color or shape designating zero emissions. This advantageously allows the external light 125 to be distinguishable from the white, red and yellow lights traditionally found on vehicles. The external light 125 is preferably around or adjacent to another light (e.g., the front headlights or the rear taillights) in order to minimize any distraction to other drivers. The external light 125 being around or adjacent to the license plate 300 provides a predictable and easy location for the third party to look in order to obtain this zero emissions information.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for notifying a third party as to whether a vehicle is producing or generating emissions, comprising:
   an internal combustion engine capable of producing exhaust gases;
   an exhaust pipe coupled to the internal combustion engine and for allowing passage of the exhaust gases;
   a sensor positioned within the exhaust pipe and configured to determine a characteristic of the exhaust gases;
   a switch configured to activate and deactivate a zero emissions mode;
   an electronic control unit (ECU) for determining whether emissions are present based on at least one of the characteristic of the exhaust gases or the zero emissions mode; and
   a transmitter coupled to the ECU for continuously transmitting emissions information, vehicle information and location information to a handheld external device.

2. The system of claim 1, further comprising an external light, controlled by the ECU, that is activated when no emissions are present.

3. The system of claim 2, wherein the external light is connected to an outside portion of the vehicle and is visible from outside the vehicle.

4. The system of claim 2, wherein the external light is positioned adjacent to a license plate of the vehicle.

5. The system of claim 1, wherein the emissions information includes information as to whether the vehicle is generating or producing emissions or operating without generating or producing any emissions.

6. The system of claim 1, wherein the vehicle information is selected from a group consisting of a make, a model, a year, a color, a type of vehicle, a license plate number, and combinations thereof.

7. The system of claim 1, wherein the location information includes the GPS coordinates of the vehicle.

8. The system of claim 1, wherein the external device has a display screen configured to display an amount and a type of the exhaust gases.

9. The system of claim 1, wherein the characteristic of the exhaust gases is selected from a group consisting of an amount, a type, a temperature, a presence, an absence, and combinations thereof.

10. The system of claim 1, wherein the zero emissions mode is an EV mode or a fuel cell mode.

11. A method for notifying a third party as to whether a vehicle is producing or generating emissions, comprising:
   determining, using a sensor positioned within an exhaust pipe of the vehicle, a characteristic of exhaust gases within the exhaust pipe;
   determining, using an ECU, whether a switch indicating a zero emissions mode is activated or deactivated;

determining, using the ECU, whether emissions are present based on at least one of the characteristic of the exhaust gases or the zero emissions mode; and transmitting, using a transmitter coupled to the ECU, emissions information, vehicle information and location information to a handheld external device.

12. The method of claim 11, further comprising activating, using the ECU, an external light when no emissions are present.

13. The method of claim 11, wherein the emissions information includes information as to whether the vehicle is generating or producing emissions or operating without generating or producing any emissions.

14. The method of claim 11, wherein the vehicle information is selected from a group consisting of a make, a model, a year, a color, a type of vehicle, a license plate number, and combinations thereof.

15. The method of claim 11, wherein the location information includes the GPS coordinates of the vehicle.

16. The method of claim 11, wherein the external device has a display screen configured to display an amount and a type of the exhaust gases.

17. The method of claim 11, wherein the characteristic of the exhaust gases is selected from a group consisting of an amount, a type, a temperature, a presence, an absence, and combinations thereof.

18. The method of claim 11, wherein the zero emissions mode is an EV mode or a fuel cell mode.

19. A vehicle capable of generating zero emissions, the vehicle comprising:

a battery for powering the vehicle;

an internal combustion engine for powering the vehicle or charging the battery;

an emissions sensor, coupled to an output of the internal combustion engine, for determining an amount of emissions being emitted from the internal combustion engine;

a mode sensor for determining whether the vehicle is in a zero emissions mode;

an electronic control unit for setting a zero emissions indicator when the amount of emissions is zero or when the mode sensor indicates the zero emissions mode; and a transmitter, coupled to the electronic control unit, configured to transmit the zero emissions indicator to a handheld third party device, which is remote from the vehicle.

20. The vehicle of claim 19, wherein the emissions sensor is configured to determine a type of the emissions being emitted from the internal combustion engine.

* * * * *